Figure 1:
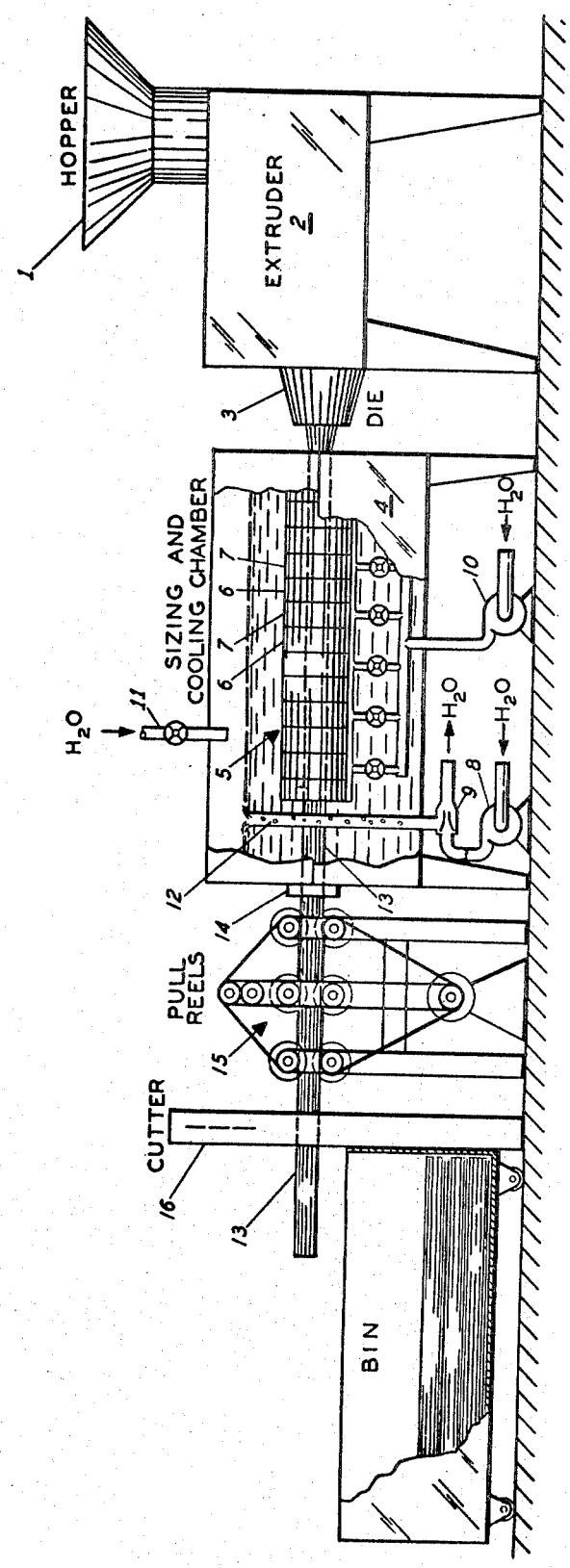

United States Patent [19]

Recknagel

[11] 3,804,567

[45] Apr. 16, 1974

[54] APPARATUS FOR COOLING AND SIZING HOT THERMOPLASTIC EXTRUDATES

[75] Inventor: Fred M. Recknagel, Clark, N.J.

[73] Assignee: Chevron Research Company, San Francisco, Calif.

[22] Filed: May 27, 1971

[21] Appl. No.: 147,704

Related U.S. Application Data

[60] Division of Ser. No. 23,087, April 6, 1970, abandoned, Continuation of Ser. No. 596,916, Nov. 25, 1966, abandoned.

[52] U.S. Cl. ................... 425/71, 425/378, 425/445, 425/446, 425/461
[51] Int. Cl. .............................................. B29d 7/20
[58] Field of Search ............ 425/445, 446, 71, 461, 425/467, 378

[56] References Cited
UNITED STATES PATENTS

| 2,987,767 | 6/1961 | Berry et al. ...................... 264/95 X |
| 3,169,272 | 2/1965 | Maxson ........................... 264/209 X |
| 3,298,808 | 1/1967 | Macks ............................. 264/209 X |
| 3,304,352 | 2/1967 | Gerow ............................... 264/95 |
| 3,313,870 | 4/1967 | Yazawa ............................. 264/95 |
| 3,321,563 | 5/1967 | Rettig et al. ...................... 264/95 |

FOREIGN PATENTS OR APPLICATIONS

| 853,745 | 11/1960 | Great Britain .................. 264/209 |
| 903,661 | 8/1962 | Great Britain .................... 264/95 |

Primary Examiner—Richard B. Lazarus
Attorney, Agent, or Firm—G. F. Magdeburger; John Stoner, Jr.

[57] ABSTRACT

Apparatus is provided for cooling and sizing thermoplastic extrudates comprising a continuous hollow porous sleeve of eventual shape of the extrudate, said sleeve having a series of adjacent transverse sections, alternating sections thereof being connected to a first liquid coolant system with sufficient pressure to force cooling liquid inwardly and the remaining alternating sections being connected to a second liquid coolant system under sufficient reduced pressure to draw a portion of the cooling liquid outwardly.

4 Claims, 2 Drawing Figures

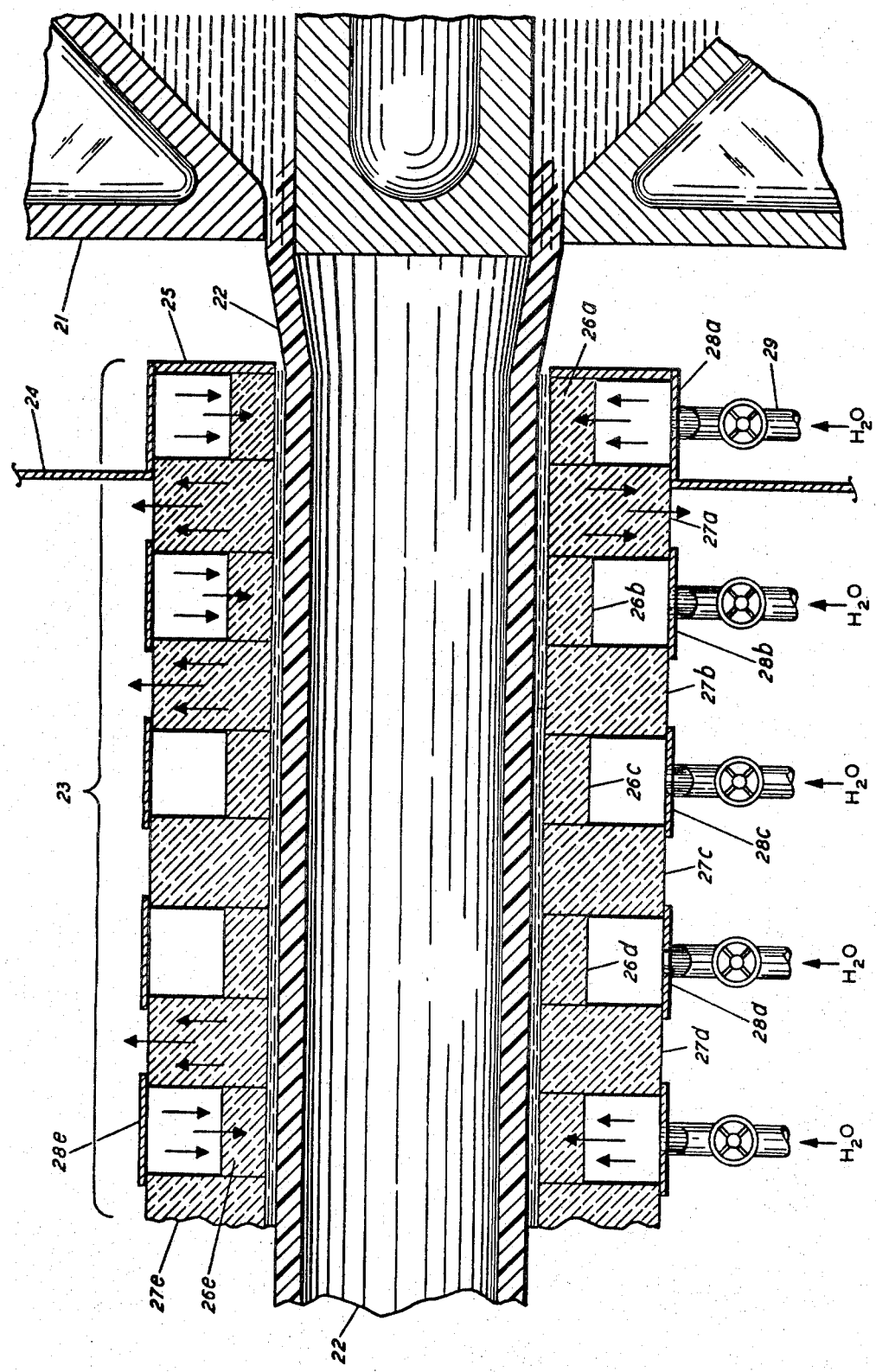

APPARATUS FOR COOLING AND SIZING HOT THERMOPLASTIC EXTRUDATES

CROSS-REFERENCE TO RELATED APPLICATIONS

This application is a division of Fred M. Recknagel U.S. appl. Ser. No. 23,087, filed Apr. 6, 1970 and now abandoned, which, in turn, has its parent Fred M. Recknagel U.S. application Ser. No. 596,916, filed Nov. 25, 1966 and now abandoned.

This invention is directed to a novel method for cooling and sizing hot thermoplastic extrudates and to an apparatus for performing that method.

A thermoplastic extrudate emerges from an extruder molten and soft. It must be cooled under conditions that will shape it to a desired configuration. In most extrusion processes this is presently done by passing the plastic directly through a die and into a cooled sizing mechanism conforming to the desired shape of the finished product. The extrudate is cooled by the sizing means until it has hardened enough to hold its own shape. Typically, the sizing means is cooled by an external coolant or by passing coolant into a cooling system running through it. The methods employing a coolant may be applied to solid extrudates of all shapes as well as hollow objects such as tubing.

The rate at which extrudates can be cooled and sized by the prior art method is limited. A maximum is reached when the sizing mechanism's surface cannot be adequately cooled so as to prevent the extrudate from sticking to it. If sticking occurs, the extrudate is deformed and the deformed extrudate must be separated from useful product. The use of a lubricant is not alone an adequate solution to the sticking problem even though it may lessen sticking to a small extent. Furthermore, the use of a lubricant does not appreciably increase the rate at which the extrudate may be cooled.

A unique process has now been found by which thermoplastic extrudates may be cooled and sized more efficiently. This novel process employs a porous cooling and sizing sleeve and involves forming a thin liquid film between the extrudate and inner surface of the sleeve. The liquid film acts as the primary heat transfer vehicle and is continuously replenished at a cooled temperature so that it does not vaporize.

This unique process for cooling and sizing hot thermoplastic extrudates comprises several integral simultaneous steps. The extrudate is passed axially through a porous sleeve having a hollowed interior of the desired eventual shape of the extrudate and having a series of consecutive alternate high and low pressure sections. A cool liquid is forced inwardly through the high pressure sections to form a uniform liquid film between the outer surface of the extrudate and the entire inner surface of the sleeve. The thin film prevents the extrudate from coming into contact with the sleeve. The pressure differential between the high and low pressure sections is sufficient to keep the liquid film flowing continuously. For hollow extrudates such as pipe the interior of the extrudate is kept at a pressure sufficiently higher than the pressure exerted on the liquid film to cause the extrudate to press out against the liquid film. Some of the liquid constituting the film is withdrawn outwardly through the porous low pressure sections while some remains to mix with incoming cool liquid from the pressure sections thus keeping the barrier between the sleeve and extrudate and cooling the extrudate. Since the extrudate does not come in direct contact with the sleeve walls, there is no sticking problem. The improved heat transfer achieved by the constant replenishment of the liquid film with cool liquid permits high production rates.

The sleeve comprises a series of consecutive sections, such as rings, each isolated from its adjacent neighbors so as to provide alternating high and low pressure sections. Desirably, each section is at least partially sealed off laterally from the adjoining section. This seal will prevent liquid from passing transversely from section to section so that the liquid will pass in the desired direction through the section. The outer surfaces of the high pressure sections are connected to the liquid source. The low pressure sections are connected to a low pressure source at their outer surfaces, preferably a vacuum of about 1 to 10 inches Hg.

The profile of the extrudate will conform to the shape of the sleeve. For cooling and sizing pipe or tubing the sleeve will, of course, be cylindrical. The sleeve will be made of porous materials through which the liquids forming the film may be passed. Typically, the sleeve will be sintered metal or porous ceramic.

The attached drawings illustrate the process of this invention and an apparatus for performing the process. FIG. 1 is an assembly drawing illustrating the use of the sizing and cooling elements of the present invention in a thermoplastic tubing extrusion apparatus. As illustrated, a hopper 1 is supported on extruder 2 of known construction and operation where the polymer material from the hopper is heated to a pliable state so as to be extrudable from a suitable die. A die 3 is shown cooperating with the extruder so as to form and convey the pliable extruded polymer into a sizing and cooling chamber 4.

Within the chamber 4 the sleeve 5 is shown as an assembly of alternate sections of porous members 6 and 7 connected to vacuum fluid systems and pressurized fluid systems, respectively. The vacuum system is operated by a driving pump 8 and venturi 9. The pressurized system is operated by driving pump 10. Water is fed to chamber 4 through valve 11. The overflow is drawn down pipe 12 to venturi 9. The cooled and sized tubing 10 is illustrated as it leaves the sleeve 5 and continues through the chamber 4.

A vacuum seal bushing 14 is fitted into the exit end of the chamber 4 so as to feed the extruded tubing into a series of driven pull reels 15. The bushing 14 maintains the vacuum within the chamber. The cooled and sized tubing is pulled at a constant tension and fed to cutter 16 and suitable storage facility to complete the manufacturing process.

The apparatus illustrated in FIG. 1 demonstrates a continuous process of plastics tubing manufacture from raw material, in this case a polymer blend, to finished product. It should be apparent that many different cross-sectional configurations may be produced with this apparatus with variations in the die 3, the sleeve 5 and the exit bushing 14.

FIG. 2 is a partially longitudinal section of a sleeve apparatus usable within the sizing chamber for cooling and sizing tubing. Generally this sleeve conforms to that shown in less detail in FIG. 1. It comprises an annular die 21 through which thermoplastic tubing 22 is extruded. The hot tubing passes into the annular opening of porous ceramic sleeve 23. Sleeve 23 is fitted into chamber 24 which is at least partially filled with water under vacuum. In the simplified schematic illustration of this figure the input end of the sleeve 23 is shown sealed with gasket 25. Sleeve 23 is divided into slotted sectors 26a, 26b, 26c, 26d and 26e and unslotted sectors 27a, 27b, 27c, 27d and 27e. The slotted sectors are jacketed by metal plates 28a, 28b, 28c, 28d and 28e and communicate with manifold 29. The sides of the slots perpendicular to the sleeve axis are sealed with suitable material such as resin to prevent lateral flow of cooling liquid inside of sleeve 23. The unslotted zones communicate freely with the water in the tank.

Cool water under pressure is pumped through manifold 29 into the jacketed cavities between slotted zones 26a–e and plates 28a–e. The water passes radially around and inwardly through zones 26a–e to form a thin film of water between the inner surface of sleeve 23 and the outer surface of tubing 22. The inside of tubing 22 is maintained at atmospheric pressure while the pressure within the chamber 24 is below atmospheric. A portion of the water film between the sleeve and the tubing is drawn through zones 27a–27e by the sub-atmospheric pressure of the chamber. The tubing 22 is continuously drawn through the sleeve 23 while being both cooled and sized therein. The thin film of the cooling liquid separates the tubing from the sleeve, acts as a lubricant and prevents any marring of the exterior surface as the tubing is formed. When, as illustrated in FIG. 2, the tubing emerges from the chamber 24 it has become sufficiently cooled to maintain its desired steps and can be cut to conveniently handled lengths.

The invention is useful for processing thermoplastic materials which are extruded at elevated temperatures, cooled and sized to form solid or hollow objects. It is especially advantageous for cooling and sizing thermoplastics which are extruded as thin-walled tubes or pipes. Such materials include amorphous polymers, crystallizable polymers and normally crystalline polymers.

Examples of thermoplastics useful in this invention are poly-α-mono-olefins of at least about 20,000 molecular weight, such as polyethylene, polypropylene, poly-1-butene and poly-4-methyl-1-pentene, copolymers of such poly-α-olefins, polystyrene, polyesters, such as polymethyl methacrylate and polyethylene terephthalate, polyvinyl halides, polyacrylonitrile, polyamides, such as polyhexamethylene adipimide and polycaproamide, polycaprolactam and the like.

Within practical limits the liquid employed in this process is not critical. It should, of course, have a low viscosity, good heat transfer capacity, relatively high boiling point and be inert to the other materials used in the process. Water is preferred. If desired, the liquid may be used for the secondary purpose of treating the extrudate surface. For instance, the liquid may contain a dye for coloring the extrudate surface.

The following example describes the sizing and cooling of tubing using an apparatus similar in all material aspects to that illustrated in FIGS. 1 and 2. This example is presented only to illustrate the process of this invention. It is not intended to limit the invention as described and claimed.

EXAMPLE I

Polypropylene (MFR ~0.4 ~95 percent crystalline) powder was fed to a conventional tubing extruder. It was extruded as ~4 in O.D., 0.33 inch wall thickness tubing at 420°–485° F. The hot tubing was passed horizontally from the die annulus into a porous ceramic sleeve. The sleeve was of medium porosity (volume % – 41–44)~4.1 inches. I.D., 6 inches O.D. and 12 inches long. One in. long, ¾ in. deep circumferential slots were cut into the sleeve at 1 inch intervals over its entire length. The sides of the slots perpendicular to the longitudinal axis of the sleeve were sealed with epoxy resin. Each slot was encompassed by a metal jacket. A manifold connected each jacket. Water at 60°–75° F., 40 psig was forced through the manifold and into the jacketed slots. The sleeve was positioned about 4 in. from the die annulus such that a slot was nearest the annulus. The sleeve was fitted into a tank and immersed in water under a 5 to 10 in. Hg vacuum. The unslotted portions of the sleeve communicated freely with the water in the tank. Atmospheric pressure was kept inside the tubing.

The cooled tubing emerging from the sleeve end held its own shape. It had a uniform 4 inches O.D. and the outer surface was not marred.

As will be evident to those skilled in the art, various modifications on this invention can be made or followed, in the light of the foregoing disclosure and discussion, without departing from the spirit or scope of the disclosure or from the scope of the following claims.

I claim:

1. Apparatus for cooling and sizing a hot thermoplastic extrudate which comprises a continuous hollow porous sleeve having inner and outer surfaces, the inner surface having the desired eventual shape of the extrudate, said sleeve having a series of adjacent transverse sections with respect to the longitudinal axis of the sleeve, each section having at least a partial lateral seal between it and its neighboring adjacent sections, the outer surfaces of alternating sections of the sleeve being connected to a first liquid coolant system under sufficient pressure to force cooling liquid through the pores in the sleeve inwardly through the sections such that the liquid contacts the extrudate and the outer surfaces of the alternating remaining sections of said sleeve being connected to a second liquid coolant system under sufficient reduced pressure to draw a portion of the cooling liquid outwardly through the section via the pores in the sleeve, said liquid coolant systems including means for maintaining the aforesaid pressures on the cooling liquid and for sealing said liquid coolant system against atmospheric pressure outside the apparatus.

2. The apparatus of claim 1 wherein the thermoplastic extrudate is tubular and the inner surface of the sleeve is cylindrical.

3. The apparatus of claim 1 wherein the sleeve is a porous ceramic sleeve.

4. The apparatus of claim 1 wherein the first liquid system is at superatmospheric pressure and the second fluid system is at subatmospheric pressure.

* * * * *